United States Patent [19]
Guo

[11] Patent Number: 5,367,542
[45] Date of Patent: Nov. 22, 1994

[54] DIGITAL DATA RECOVERY USING DELAY TIME RULERS

[75] Inventor: Bin Guo, Cupertino, Calif.

[73] Assignee: Advanced Micro Devices, Inc., Sunnyvale, Calif.

[21] Appl. No.: 901,335

[22] Filed: Jun. 19, 1992

[51] Int. Cl.$^5$ .............................................. H04L 7/02
[52] U.S. Cl. .................................... 375/110; 375/118; 327/271
[58] Field of Search .......................... 375/110, 118, 94; 341/68; 328/55; 307/269, 601, 602

[56] References Cited

U.S. PATENT DOCUMENTS

| | | | |
|---|---|---|---|
| 3,581,010 | 5/1971 | Kabayashi | 375/110 |
| 4,513,427 | 4/1985 | Borriello et al. | 375/110 |
| 5,146,121 | 9/1992 | Searles et al. | 307/603 |

FOREIGN PATENT DOCUMENTS 0081750 6/1983 European Pat. Off. .

OTHER PUBLICATIONS

"IBM Technical Disclosure Bulletin" vol. 32, No. 5B, 1 Oct. 1989, Armonk, N.Y., US.

*Primary Examiner*—Tesfaldet Bocure
*Attorney, Agent, or Firm*—Gerald Fisher

[57] ABSTRACT

All digital, high frequency data separation receiver apparatus and method for ascertaining the correct sequence of received digital data without a phase locked loop or an analogue voltage control oscillator (VCO) method, which employs a series of time delay circuits to establish time rulers to unambiguously determine the sequence of received bits.

15 Claims, 6 Drawing Sheets

Tstep : IN to OUT
Tdop : IN to DOUT

DIGITAL DATA RECOVERY USING DELAY TIME RULERS

FIELD OF THE INVENTION

This invention relates to data separation apparatus and methods for recovery of digital data from serially transmitted data.

RELATED APPLICATIONS

The following applications, filed concurrently and assigned to the same assignee, are incorporated herein by reference:
1. "Digital Data Serializer And Time Delay Unit Regulator," Ser. No. 07/901/312; filing date Jun. 19, 1992; inventor(s) Bin Guo and James Kubinec.
2. "Digital Jitter Correction Method And Signal Preconditioner," Ser. No. 07/901,360, filing date Jun. 19, 1992; inventors Bin Guo and Michael Behrin.

BACKGROUND OF THE INVENTION

Highly sophisticated receiver techniques for accurately recovering digital data from a serial transmitted binary modulated waveform have been previously developed. As the frequency i.e., bit rate, of the data has increased, the noise sources such as timing jitter, caused by transmission medium and asymmetrical rise and fall times of the components in the transmitter/receiver and in the interconnecting link, and other sources make increasingly more stringent demands on the data recovery circuits. Most commonly, in the prior art, the receiver employs a circuit for recovering the bit clock rate from the transmitted incoming serial data and then locks a voltage controlled oscillator (VCO) to a frequency derived from the bit clock rate of the incoming serial data. Usually, this employs a so called Phase Locked Loop (PLL) which tracks the error in phase or frequency between the VCO and the incoming data, employing averaging and smoothing, and applies this smoothed error signal to correct the VCO. The receiver circuit then employs the PLL recovered bit clock which controls the receiver timing and in particular controls the time that the incoming serial data is sampled. This sampling moment is known as the "center of the data eye." Due to noise sources of jitter and asymmetry, it is understood that the state of a binary signal is most uncertain in the vicinity of the transitions from one level to the other. Accordingly, even in the presence of such noise sources, the center region of the data eye is the region in the waveform when the data is most likely to be correctly and reliability read.

In the prior art, even a slight frequency difference between the data rate and the VCO generated bit clock, was integrated and resulted in large phase error so that the sampling no longer takes place at the center of the eye. In conventional CMOS, the PLL performance is generally good at frequencies under 125 Mb/s. Another problem with the prior art PLL is that PLLs generally are implemented in analogue circuitry with capacitors and other lumped parameters which are difficult or impossible to implement in an large scale integrated circuit. Large scale integrated circuit process technology lends itself more readily to digital implementation as opposed to analogue linear circuits.

Digital phased locked loops are known, such as is found in U.S. Pat. No. 4,584,695 and U.S. Pat. No. 4,821,297. These prior patented techniques have used delay lines to produce a plurality of multiphase clock pulses, and then attempt to select the clock pulse with the appropriate phase to read the data. Such techniques need either analogue controls, or a fixed clock running at the bit rate, or special data coding schemes such as the Manchester encoding.

A need exists for an all digital data recovery solution which performs high speed data recovery functions without requiring recovery of a bit rate clock or use of a PLL.

SUMMARY OF THE INVENTION

It is an object of this invention to enable very high speed deserialization of incoming digital data with an all digital implementations.

It is another object to provide deserialization of incoming digital data without recovering a clock at a bit rate from said incoming digital data.

It is still another object to provide deserialization without requiring a phase locked loop.

It is still a further object to provide a data separator implementation which can be readily implemented in standard digital integrated circuit form.

Conceptually, my method and apparatus to carry out the method, is simple. In NRZI coded data, called differential encoding, we know that every transition clearly marks a "one" and no change, i.e., transition occurs for a "zero." Accordingly, the problem in separating such data is to determine accurately how many "zeros" occur between the "ones." To determine the number of zeros, I provide a delay line made up of a series of equal delay units, where each delay unit equals 178 $T_b$, where $T_b$ is the period of the transmitted data clock. By creating a Master Time Ruler (MTR) and Standard Time Ruler (STR), with a series of such delay units, I am able to account for jitter and non-ambiguously determine the number of zeros by determining the valid number of expiration periods of the MTR and STR periods.

DETAILED DESCRIPTION OF THE INVENTION

Figure 1:
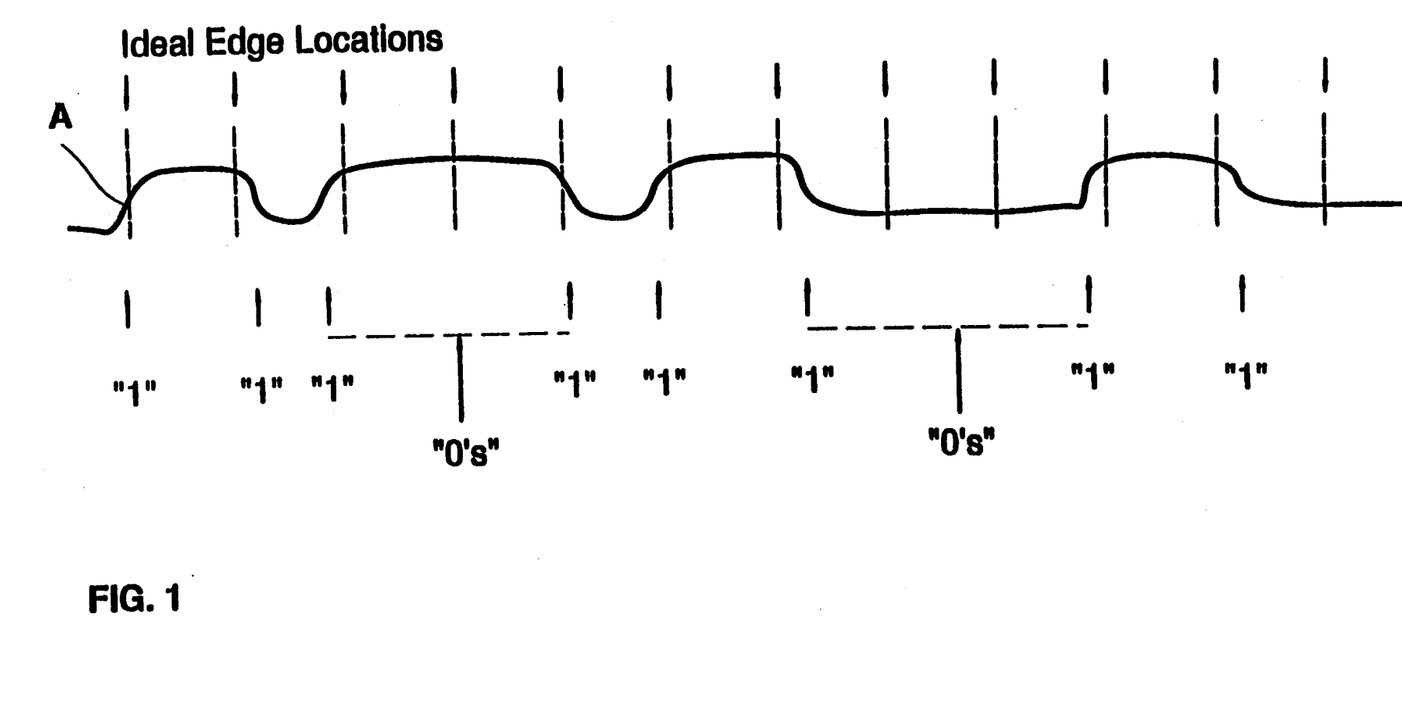
FIG. 1 is a timing diagram illustrating jitter in serial binary NRZI data format.

With reference to FIG. 1, a binary NRZI waveform, A, is shown with typical rise time and fall time asymmetries and other random phase relationship with respect to ideal edge location, i.e., jitter. Above the waveform are shown, equally spaced in time from one another, arrows which mark the ideal edge locations of the transitions of the waveform. The data is transmitted using differential encoded format which means that the waveform changes state on the occurrence of one of the logical levels, i.e., in this case, the waveform changes state on the occurrence of a logical one and is called non-return-to-zero-inverted-on-one (NRZI). Due to the noise sources described above, jitter in the waveform, A, will cause a transition detector which is evaluating the waveform, A, to issue non-equally spaced output pulses, marked with "1" at the zero crossovers of the waveform A. This zero crossover point location is illustrated by the location arrows under waveform A. Also note that waveform A has portions which cross over several ideal edge locations without a change in state. This means that a zero or a plurality of zeros had to have occurred in the regions shown below waveform A marked "0's."

Figure 2:
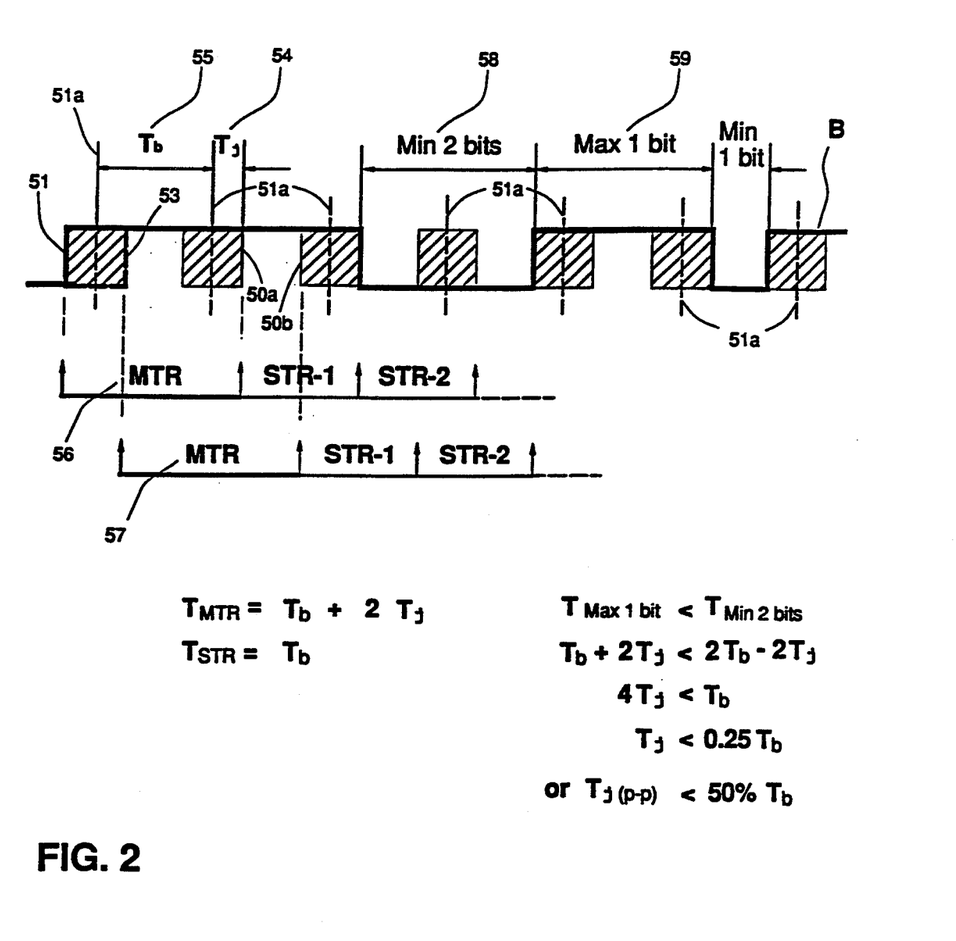
FIG. 2 is illustrative of the Master Time Ruler (MTR) and Standard Time Ruler (STR) regarding an incoming data stream.

With reference to FIG. 2, I explain a concept which employs time measurements which I call "Master Time Ruler" (MTR) and "Standard Time Ruler" (STR). The waveform B has cross hatched areas on both sides of the ideal edge location indicated by the vertical lines, 51a. The cross hatched area represents the time blocks during which a particular edge or transition may occur when an early or late timing jitter is associated with that edge. The width of the area (length of time lapse) depends on the peak-to-peak value of the timing jitter, and here it is shown as $2T_j$, 54. We also show a bit period $T_b$, 55. We define the Master Time Ruler (MTR) as $MTR = T_b + 2T_j$. This MTR region is the period of time from occurrence of a transition, e.g., "1," which one must allow to elapse before one can determine with certainty whether the next bit is a zero. One doesn't need to do timing to determine ones in this system because a transition will occur on every one. Regardless of jitter, we restart our bit determination on the occurrence of every one. Accordingly, we only need to determine, if the next bit after a "one" is a zero and how many zeros may be contiguous. We set the $MTR = T_b + 2T_j$ because there is the possibility that the leading edge 51 arrives with the earliest possible jitter condition and MTR must include the possibility that the next bit transition occurs at the latest possible jitter time. Also, I define $STR = T_b$, where $T_b$ is the bit period of the incoming data frequency.

My concept for data recovery without a PLL is to detect transitions in NRZI data and to designate each transition as a "one" and to start an MTR which is long enough to encompass any transition if the next bit is a one. At the end of MTR, a sequence of STR is started and I use the MTR and STR to determine the number of "zeros" between each "one." With respect to FIG. 2, consider the example where MTR, 56, starts at the earliest possible edge locations 51 of a bit, and ended at the latest possible edge location of the next bit. Also consider the example where MTR, 57, starts at the latest possible edge location 53 and ends at the border of the region belonging to the bit following the next bit. In this system, in order to distinguish a "min 2 bit," 58, from a "max 1 bit," 59, the following jitter range specification must apply:

$T_{max1bit} < T_{min2bits}$
$T_b + 2T_j < 2T_b - 2T_j$
$4T_j < T_b$
$T_j < 0.25 T_b$ FIG. 2 shows that the MTR initiated between MTR, 56 and MTR, 57 must end somewhere between the two consecutive cross hatched areas 50a and 50b. STR is chosen to be equal to $T_b$, then if no transition occurs before that interval of time is over, the bit must be a zero. The STR provides the bit clock rate.

Figure 3:
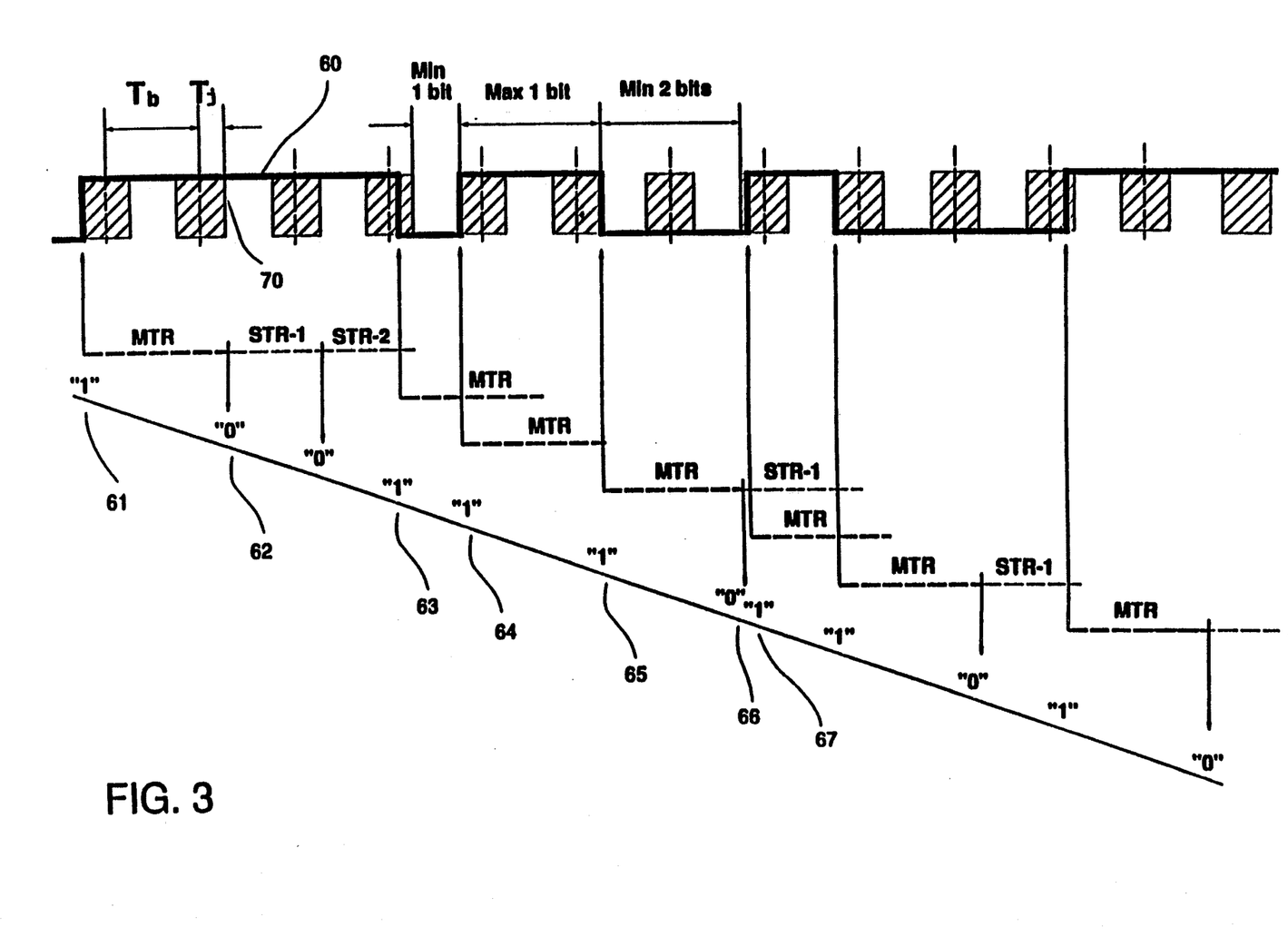
FIG. 3 is timing diagram showing bit-by-bit decision using time rulers.

Consider FIG. 3, which illustrates the bit-by-bit decision process according to my method. The cross hatched region illustrates the maximum extent of jitter, $\pm T_j$ about the ideal transition time as it did in FIG. 2.

The waveform 60 is an example waveform representing a portion of serial incoming data with some edges being early and some being late. Starting with the first bit decision 61, which is determined as a data bit "1" because of the transition or rising edge detected. A Master Time Ruler (MTR) time measurement starts at the time the transition is detected and lasts for the length of the $MTR = T_b + 2*T_j$. Since this time measurement starts at an edge which is considered in this example at an earliest possible location, the MTR will be just ended at the latest location 70 of the shaded region for the following bit. At this point, a data bit "0" 62 is determined since no transition has been detected for the time interval where a transition should have occurred if there have been one. A Standard Time Ruler check is then initiated and lasts for a $STR = T_b$. Again, no transition is detected for the time duration corresponding to the shaded region, so a subsequent bit "0" is determined. Then, another transition corresponding to data bit "1", 63, is detected, so the process of detecting a transition and registering a data bit "1" repeats. Note that the previously initiated Standard Time Ruler check is not valid anymore because of this detection, and has to be discarded as mentioned earlier. The determination of data bit 64 as a "1" occurred shortly thereafter, before the expiration of the previous MTR. Besides the determination of bit "1" 65, the previous MTR check also has to be discarded. The following two bits 66 and 67 show that right after the expiration of a MTR, a bit "0", 66, is determined, then a transition is detected and a bit "1", 67, has to be registered. Practically, how close these two bits can be or how much it can be tolerated depends on data rate, and circuit technology or speed used.

Figure 4:
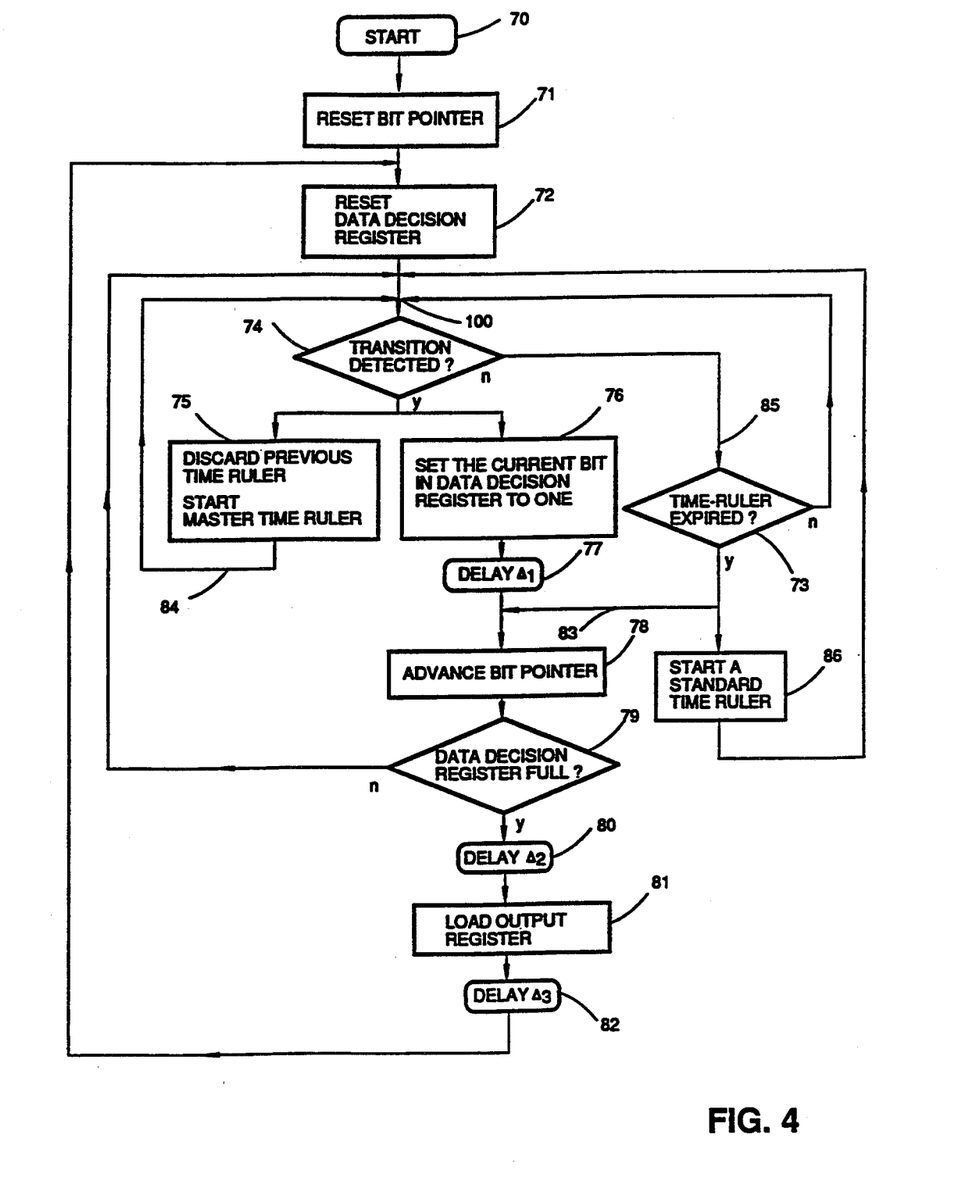
FIG. 4 is flow chart of algorithm used in accordance with the invention.

In FIG. 4, the algorithm descriptive of my method is illustrated. At the start, a register setting step 71, resets to zero the Bit Pointer Register, FIG. 5, 22, which keeps track of the bit position in a deserialized output data.

Next, the transition detector output is evaluated 74, to see if a transition has occurred. If not, the loop repeats via 85 and 73 since no time Ruler has started at this point. If a transition is detected, the current bit in Data Decision Register (the first bit at this point) is set to one, 76, and the previous time rulers (none at this point) are discarded and a new time-ruler (a MTR) starts in step 75. Simultaneously, the Bit Pointer is incremented 78, after delay 77, and if the number of decided bits does not fill the Decision Register Step 79 (as is in this instance), the control loops back to check if a new transition has occurred and if the current time ruler is expired. If a new transition is detected, the above process repeats except when Data Decision Register is full. If no transition is detected before the current time ruler expires 73, the Bit Pointer 78 is advanced without setting the current bit of the Data Decision Register. This will result in a zero being recorded in the Data Decision Register for that bit. Simultaneously, a subsequent standard time ruler starts, 86, and control loops back to the same point 100 where transition detection in evaluated. In the event that the data decision register is filled 79, the output register is loaded 81 from the data decision register, after delay 80. Next, the control loops back to reset the data decision register after delay 82, and the detection of a new transition and checking of time ruler expiration repeats.

Figure 5:
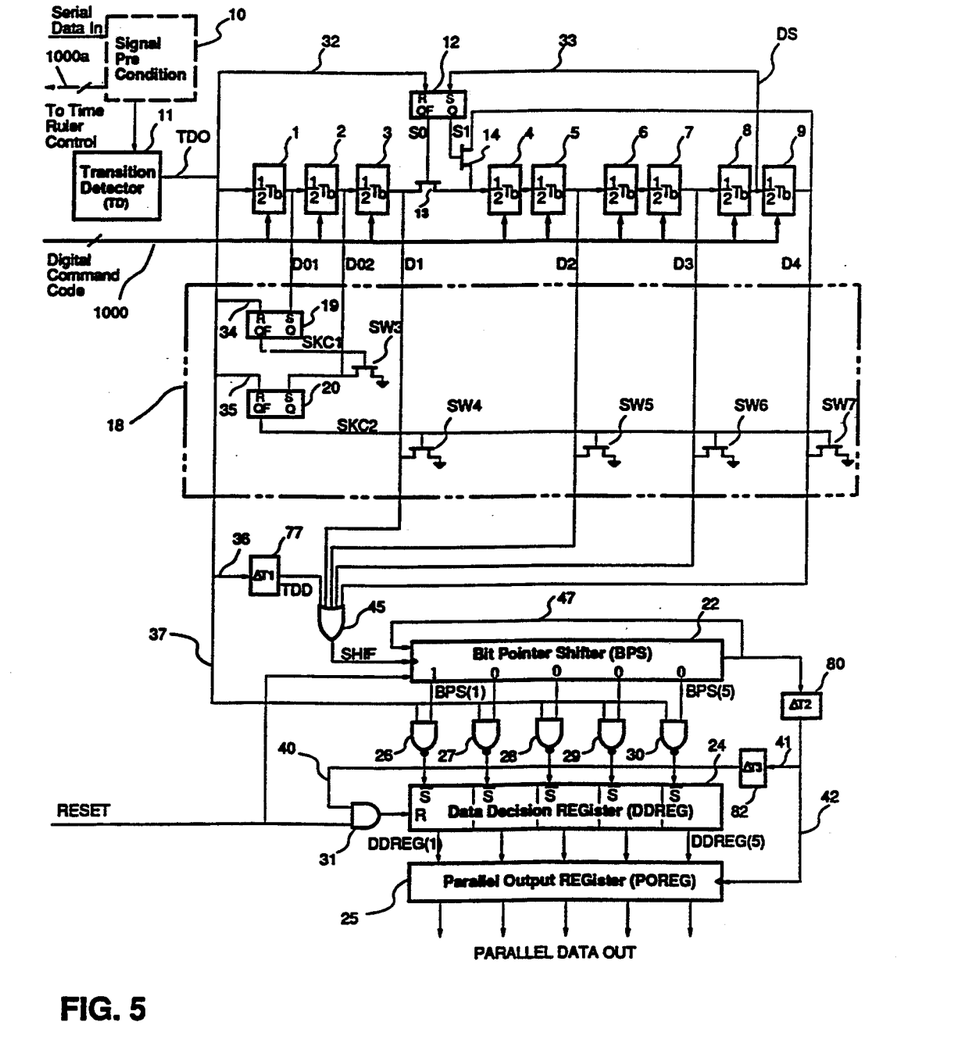
FIG. 5 is block diagram of an embodiment of my invention for providing output in 5 bit data symbol.

The preferred embodiment of my invention in an all digital implementation is illustrated schematically in FIG. 5.

If the peak-to-peak jitter of any two consecutive edges on the data stream could exceed ±25% of the bit period time, then the circuit design must pass the serial in data through a preconditioner circuit 10 before it is applied to transition detector 11. For purposes of this explanation we do not describe the preconditioner circuit 10 since the preconditioner does not make up part of this invention. For these purposes, we assume that the jitter cannot exceed ±25% of the bit period time.

For every transition in the serial data in, a narrow pulse will be produced in transition detector 11 at output TDO. A few of the timing signals depend on this narrow pulse. They are as follows:

1. TDO pulse is simultaneously sent to NAND gates 26-30. Each gate is connected on its other input to a different stage of the Bit Pointer Shifter (BPS) 22. Whichever bit of the register 22 that is currently at a "one" state is gated through to set the corresponding bit in Data Decision Register (DDREG) to a "one." The BPS 22 shifts the "one" through its register, one bit at a time and indicates the current bit location in a selected width parallel output. Recalling the earlier explanation, the "one" transition on the serial incoming data immediately sets a one in the recovered data.

2. The TDO also is sent to time delay 77, and after enough delay to permit data "1" to be latched in DDREG 24, the output of time delay 77 through OR gate 45 generates a shift command, SHIF to BPS 22 to move the bit pointer to the next bit.

3. In addition, TDO starts the narrow pulse traveling down the delay train 1-9.

4. TDO resets the path selector flip flop 12, which will be explained subsequently; and 5. TD0 initiates the pulse sink function which circuitry is in the area 18 outlined by the dashed lines. The function of the pulse sink circuits is to discard the previous pulse which may still be traveling in the delay train. The sinking function must be completed in time so that it will not interfere with the most recent pulse when the most recent pulse arrives at D1 in the train.

The time ruler function, Master Time Ruler and Standard Time Ruler are provided by connecting together the ½ bit time delay elements such as disclosed in FIG. 5. The data bit "0" registration is accomplished as follows:

If there is no narrow pulse seen at TDO prior to the time that the most recent pulse arrived at D1, (or D2, D3, or D4) it indicates that the time ruler has expired while looking for another transition. If so, a "0" is registered for the current bit. This is accomplished by simply advancing the rotating bit pointer shifter (BPS) 22 to the next bit without loading a "one" into the corresponding bit of the Data Decision Register (24). When, BPS 22, after 5 bits, shifts the "1" back to input via connector 47, it also strobes the Parallel Output Register (25), through delay 80 to latch the data in Data Decision Register and then, via time delay 82, causes reset of the Data Decision Register 24 via line 40 back to AND gate 31 and to the reset R.

The delay elements 1 through 3 form the MTR while delay elements 4-5 form STR-1, elements 6-7 form STR-2 and elements 8-9 form STR-3. After the narrow pulse passes through switch 13, the flip flop 12 is caused to switch open switch 13 and close switch 14 before the pulse arrives at D4. The switch command comes when the pulse is between D3 and D4. This circuitry is only needed if more than four zeros occur in a row. This switch allows the STR delays to be reused if there are more than 4 consecutive zeros.

The pulse sink function circuit 18 is implemented by flip flop 19 and 20 and five switches SW3-SW7. When a new transition is detected, a new Master Time Ruler has to be started and the previous time ruler discontinued. This discontinuation is accomplished by grounding the pulse whenever it arrives at points D1 through D4 for a period of one bit period.

Since the minimum time between any two consecutive transitions cannot be less than or equal to half of the bit period based on 50% total peak-to-peak jitter assumption, then no pulses can be closer than half a bit period. Accordingly, no two pulses could be in a unit delay element at any one instant of time. Therefore, by grounding the delay outputs D1 through D4 for 1 bit time assures that the previous pulse is removed from the delay train.

Figures 6A, 6B:
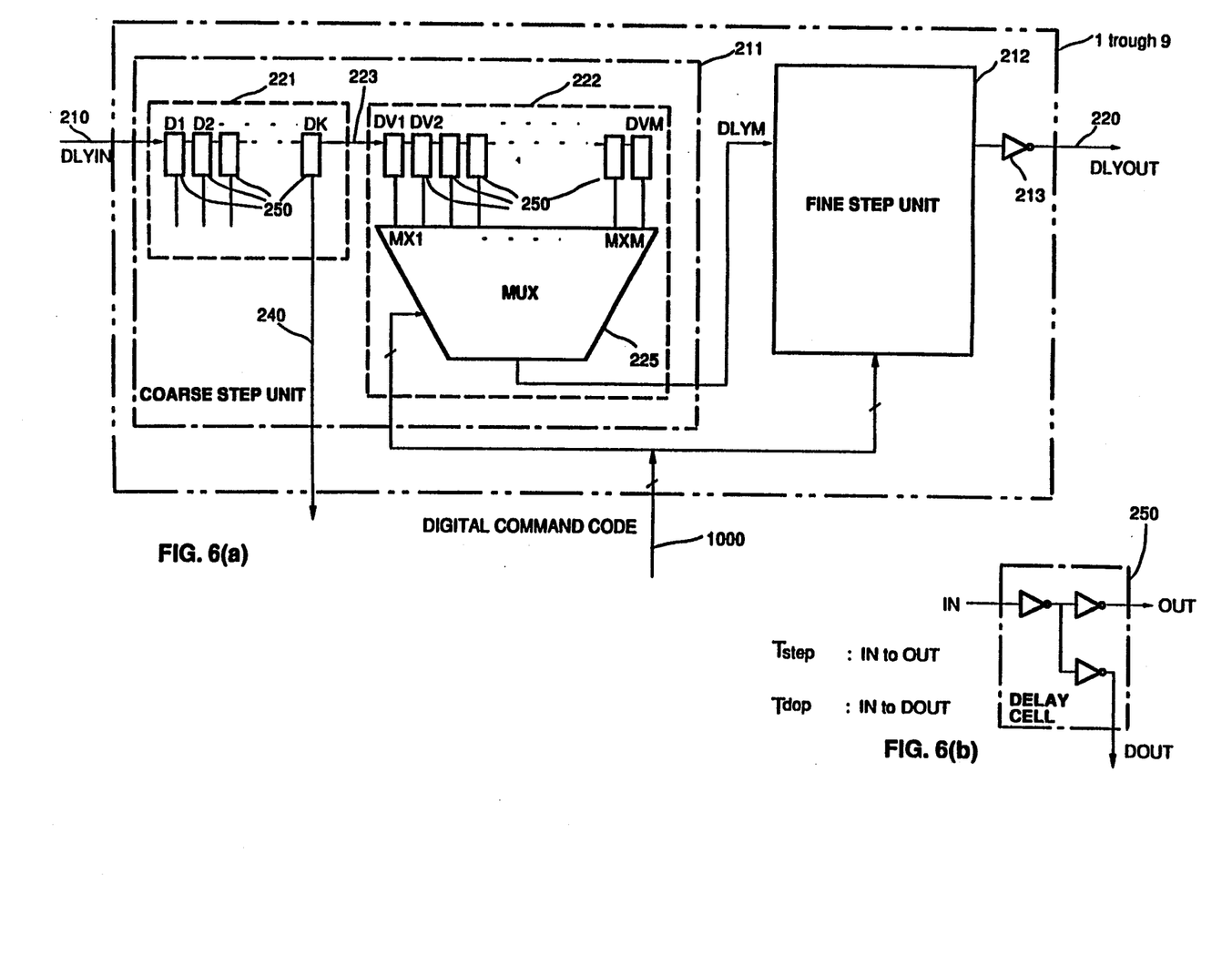
FIGS. 6(a) and 6(b) are block diagrams an embodiment of a preferred time delay element.

The performance of the system of FIG. 5 depends upon the accuracy of the time delay in the basic delay elements. Each of the delay elements 1 through 9 employed in this implementation are adjustable in response to the digital command control code on line 1000 which is fed to every delay unit. The unit delay circuits and their control are not part of this invention but it is described and claimed in copending referenced patent application and incorporated herein by reference entitled "Digital Data Serializer And Time Delay Unit Regulator." With reference to FIG. 6(a), the unit delay circuit which provides each of the ½ $T_b$ delays 1 through 9 is shown. In a non-integrated circuit implementation unit delay 1-9 could be self regulated units which would not require an external control signal.

In the preferred embodiment, the receiver of FIG. 5 is part of an integrated circuit which also includes a transmitter, i.e. the related application entitled Digital Data Serializer and Time Delay Regulator. It is expected that the digital command code generates for time delay regulation in the transmitter will be provided to the receiver on line 1000, FIG. 5. Since the IC circuits will be at the same temperature and will have been manufactured using the identical processes at the same time, it is likely that the digital command code for the transmitter delay units will be correct for the receiver delay units within a small error. It is recognized that there can be instances where the accuracy demanded could not permit such an error. In such instances, the digital command code on line 1000 should be acquired directly from the incoming data. The alternative is illustrated in FIG. 5 as the output bus 1000 from the signal proconditioner circuit 10 to Time Ruler Control Block which enables the choice of the source of the digital command code.

There is always a finite error between the time of the actual delay of the unit delay units 1 through 9, and the bit interval of the incoming serial data. However, because each detected "one" resets the time rulers, this error is not integrated over many pulses as it is in prior art PLL systems. In fact, in a quasi-DC balance controlled code, such as 4B/5B code of the Fiber Distributed Data Interface (FDDI) standard, the maximum spacing between any two consecutive transitions in a data sequence is limited to three bits. For use with such systems where no more than three bit intervals between any two consecutive transitions occur, the switches 13 and 14 are used only when receiving symbols representing certain line states.

It is noted that the invention of this application does not disclose all of the circuits and methods needed for accurate data recovery, but addresses the portion of the recovery problem which determines the correct recovery of sequences of "ones" and "zeros" in the midst of time jitter. After the digital data is correctly recovered and deserialized, subsequent byte alignment can be performed at a byte clock rate. Various schemes could be employed in conjunction with this invention to establish byte or frame alignment. It is also noted that the invention uses NRZI encoded data for illustrative analysis purposes. Data encoded in NRZ or other coding schemes may be recovered according to the invention with modified steps, or may be recovered as NRZI encoded data followed by standard format conversion.

The embodiment described is not intended to restrict the invention and is presented as the best mode for illustrative purposes. Many modifications and variations are possible. It is intended that the scope of the invention shall be determined by the following claims.

Accordingly, what I claim is:

1. Apparatus for recovering data having a bit clock period from a serial train of incoming binary data without the use of a phase locked loop oscillator comprising,
   (a) a delay circuit having an input and output;
   (b) transition detector means for electrically analyzing said serial train of incoming data and providing a first signal output marking the time of the occurrence of a change from one binary state to the other in said train of incoming data;
   (c) means for simultaneously and immediately launching a pulse into said delay circuit responsive to said occurrence of said first signal output;
   (d) said delay circuit being a series connected plurality of delay unit elements, each said delay unit causing delay to said pulses passing there through;
   (e) all digital circuit means for sequentially determining the binary state of each bit in said serial train of incoming binary data by assigning a one state to each period initiated by the occurrence of said first signal and assigning a zero state for each period established by the passage of said launched pulse through delay unit elements having a total delay time of said bit clock period during which time no said first signal is issued by said transition detection means, and
   (f) means for storing said sequentially determined ones and zeros as the deserialized binary sequence.

2. The apparatus of claim 1 which includes means responsive to the occurrence of said first signal to discard all pulses then in said delay circuit without disturbing said pulse launched into said delay circuit responsive to the same said first signal output.

3. The apparatus of claim 2 wherein said means for sequentially determining the binary state of each bit in said serial train includes,
   data decision means for sequentially establishing the value of a block of bits in said serial train,
   said data decision means includes
   (a) a bit pointer, said bit pointer comprising N stages, one stage for each bit in said block of bits, said bit pointer having a shift command input,
   (b) said unit delay elements outputs being coupled to said bit pointer, said bit pointer being advanced to the next bit by either the occurrence of said first signal, or by the occurrence of a pulse at the output of said unit delay elements to note the passage of time equal to a Master Time Ruler (MTR) or Standard Time Ruler (STR) where said $MTR = T_b + 2T_j$ and $STR = T_b$ and where $T_j$ is jitter period equal to a maximum of 0.25 $T_b$ and where $T_b$ is the bit clock period.

4. The apparatus of claim 3 wherein said data decision means includes a data decision register for storing said determined bit sequence, said data decision register being an N stage register, each said N stage of said data decision register having a set input terminal,
   a plurality of AND gates, each said AND gate having a plurality of inputs and an output, the output of each one of said AND gates being connected to one of said set input terminals of said data decision register, one of said inputs of each of said AND gates being connected to said transition detector output.

5. The apparatus of claim 2 wherein said delay units are adjustable in its delay.

6. The apparatus of claim 5 wherein said delay adjustment of said delay units is responsive to a digital command word.

7. The apparatus of claim 2 wherein said means to discard all pulses in said delay circuit responsive to said first signal output comprises means to apply ground potential to the outputs of a plurality of said delay circuits.

8. The apparatus of claim 7 wherein said means to apply ground potential is a plurality of FET switches, each said FET switch being coupled to a said delay circuit output at one FET electrode and another FET electrode being coupled to ground.

9. The apparatus of claim 3 wherein all said unit delay element outputs are coupled to an OR gate, said OR gate output being coupled to said shifter command input of said bit pointer.

10. The apparatus of claim 1 wherein said delay units are adjustable in delay.

11. The apparatus of claim 10 wherein said delay adjustment of said delay unit elements are responsive to a digital command code.

12. A method of unambiguously establishing the sequence of ones and zeros in a serial train of high rate binary NRZI data comprising,
   establishing a data bit being a one as occurring in said sequence upon detection of a transition in said serial train;
   employing the said detection of a transition as a command to immediately start a first time ruler, said first time ruler period being a Master Time Ruler (MTR);
   establishing a first data bit as being a zero upon the occurrence of the expiration of said MTR if no new transition is detected in said serial train before expiration of said MTR; and
   employing the expiration of the said first time ruler as a command to immediately start a second time period being a Standard Time Ruler (STR); and
   establishing a second zero upon occurrence of the expiration of said STR if no new transition is detected in said serial train between expiration of said MTR and said STR.

13. The method of claim 12 wherein said MTR period is initiated by launching a pulse into a first delay line, said first delay line being a three unit delay line and wherein a first said STR is initiated upon expiration of said MTR, by launching a pulse into a second delay line, said second delay line being a two unit delay line upon expiration of said MTR.

14. The method of claim 13 wherein a second said STR period is initiated by launching a pulse into a third delay line, said third delay line being a two stage unit delay upon expiration of said first STR period.

15. The method of claim 14 wherein pulses which are still resident in each said unit delay lines other than said first delay line are purged immediately responsive to the occurrence of the detection of each said transition in said serial train of high speed binary data.

* * * * *